No. 866,048. PATENTED SEPT. 17, 1907.
W. D. McATLIN.
METALLIC FENCE POST.
APPLICATION FILED DEC. 22, 1906.
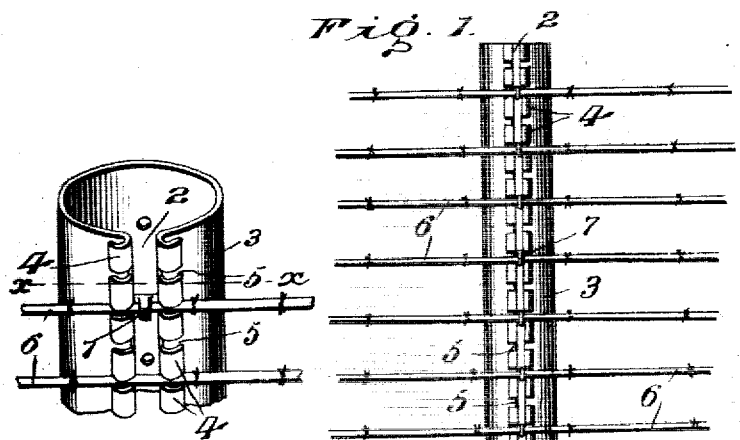
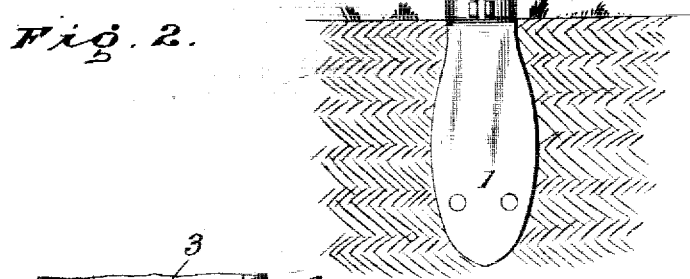
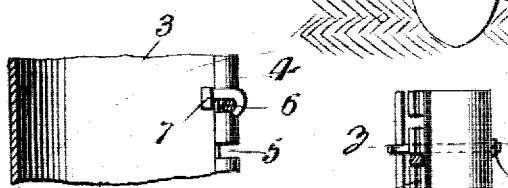
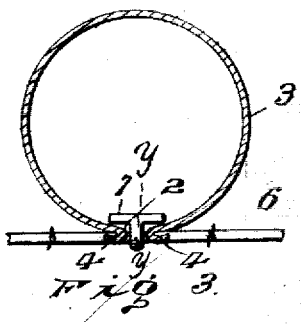
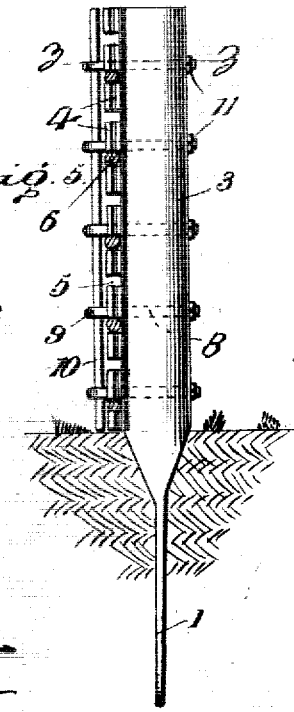
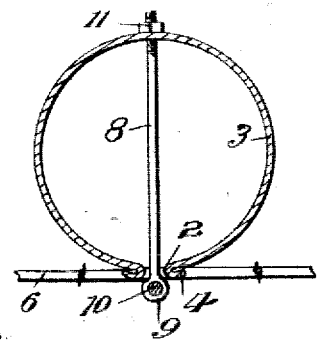

UNITED STATES PATENT OFFICE.

WILLIAM D. McATLIN, OF TULLVANIA, MISSOURI, ASSIGNOR OF ONE-HALF TO AARON HYAMS, OF SIOUX FALLS, SOUTH DAKOTA.

METALLIC FENCE-POST.

No. 866,048.　　　Specification of Letters Patent.　　　Patented Sept. 17, 1907.

Application filed December 22, 1906. Serial No. 349,126.

*To all whom it may concern:*

Be it known that I, WILLIAM D. McATLIN, a citizen of the United States, residing at Tullvania, in the county of Macon and State of Missouri, have invented certain new and useful Improvements in Metallic Fence-Posts, of which the following is a specification.

This invention relates to fences of the type embodying posts and runner wires, the purpose being to devise a support for the runner wires of novel formation and which is durable and adapted to admit of the runner wires being readily and quickly placed in position, or removed as may be required.

For a full description of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a front view of a fence post embodying the invention and showing runner wires attached thereto.
Fig. 2 is a perspective view of a portion of the post on a larger scale. Fig. 3 is a horizontal section on the line x—x of Fig. 2. Fig. 4 is a vertical section of a portion of the post on the line y—y of Fig. 3. Fig. 5 is a side view of a modification. Fig. 6 is a horizontal section on the line z—z of Fig. 5.

Corresponding and like parts are referred to in the following description and indicated in all the views of the drawings by the same reference characters.

The fence post is hollow and is provided at its lower end with a flattened point 1 of sufficient breadth to give firm anchorage when driven, or otherwise let into the ground. The flattened point 1 is tapered at its extremity to readily penetrate the ground when driven therein. While the tapered flattened point 1 is preferred, it is to be understood that the end of the post adapted to be buried in the ground may be of any design. The post, or the part thereof extending above the ground, is hollow and may be of any outline in horizontal section, circular form being preferred. A vertical slot 2 is formed, or provided in a side of the post 3 in any manner and the edge portions bordering upon the slot 2 are outwardly bent and recurved as shown at 4, and these outer extensions 4 are notched at intervals in their length as indicated at 5, the notches alining horizontally so as to receive the runner wires 6. By having the outwardly extended edge portions of the post bordering upon the slot or opening 2 recurved, sharp edges are prevented and the post is materially stiffened particularly at the point subjected to the greatest strain. By having the notches 5 closely re-lated, *i. e.*, about one-quarter of an inch apart, the post is adapted to receive any number of wires and to have the same practically spaced any difference apart.

Any suitable means may be employed for securing 
the runner wires 6 in the notches 5 of the outwardly extended portions 4 of the post and as indicated most clearly in Fig. 3, such means consists of a T fastening 7. The cross-head of the T fastening sits crosswise of the slot, or opening 2, and engages with opposite portions of the post bordering upon the said slot, or opening 2, whereas the stem of the fastening passes through the slot 2 and is bent into hook form to engage the runner wire and prevent outward displacement thereof. The T fastening may be placed in position in any convenient way and by use of any suitable tool that may be provided for the purpose, it being preferred to employ a tool especially adapted for the purpose. The cross-head of the T fastenings is passed through the slot or opening 2 after which the fastening is given a one-quarter turn to cause the cross-head to occupy a position about at a right angle to the slot and subsequent to this operation, the end of the stem is bent to engage the runner wire. This construction is best adapted for permanent fences.

When adapting the invention for the construction of temporary fences for hay stacks, for partitioning inclosures, for setting off places for corralling stock, or for other purposes, the construction illustrated in Figs. 5 and 6 has been devised. In this adaptation of the invention, rods 8 are employed and said rods are threaded at one end and provided at the opposite end with eyes 9 in which a rod 10 is supported. The rods 8 are passed through the slot, or opening 2, and through an opening in the rear side of the post opposite to the slot 2, the projecting threaded ends being supplied with nuts 11.
After the runner wires 6 are placed in position, in the notches 5 of the outwardly extended portions of the post, the rod 10 is slipped through the eyes 9 of the rods 8, after which the nuts 11 are turned so as to draw the rod 10 inward against the runner wires and thereby prevent their accidental displacement from the notches 5, said rod 10 serving as it were, to clamp the runner wires and to deflect the same between upturned edge portions 4, thereby preventing any longitudinal movement of the runner wires when subjected to linear strain. By loosening the nuts 11, the runner wires are liberated and the fence may be taken down to be again set up when required for further service.

Having thus described the invention, what is claimed as new is:

1. A fence post comprising a hollow portion having a longitudinal slot in one side and having portions bordering upon the slot outwardly extended and recurved and formed at intervals with corresponding transversely alined notches to receive the runner wires, and fastening means passed through the slot of the post and engaged with the latter at one end and having the opposite end engaged with the runner wires to hold the same in place.

2. A fence post comprising a hollow portion having a longitudinal slot in one side and having the edge portions of the post bordering upon said slot outwardly extended and formed with notches to receive the runner wires, and fastenings engaged at their outer ends with the runner wires and passed through the slot of the post and having cross heads at their inner ends projected transversely of the slot and having their ends in engagement with edge portions of the post bordering upon the said slot.

3. The herein described fence post comprising a hollow body portion provided in one side with a longitudinal slot and having the edge portions bordering upon the slot outwardly extended and recurved and formed with transversely alined notches and a flattened and tapered point, the body portion and point being of integral formation.

In testimony whereof I affix my signature in presence of two witnesses.

WILLIAM D. McATLIN. [L. S.]

Witnesses:
R. M. SMITH,
L. F. HARRIS.